Patented Aug. 25, 1936

2,051,812

UNITED STATES PATENT OFFICE 2,051,812

OPEN CHAIN ALLYL CITRYLIDENE ACETONE

Henri Barbier, Geneva, Switzerland, assignor to Givaudan-Delawanna, Inc., New York, N. Y., a corporation of New York No Drawing. Original application September 18, 1930, Serial No. 482,906. Divided and this application December 28, 1932, Serial No. 649,152

1 Claim. (Cl. 260—134)

This invention relates to the open chain condensation product of citral and allyl acetone in the presence of alkaline condensation agents, and is a division of my copending application, Serial No. 482,906, filed September 18, 1930.

Heretofore, compounds known as open chain ionones have been obtained by condensing citral with acetone. The object of the present invention is to provide a new compound of this general type, and a process of obtaining same.

According to the present invention citral is treated with allyl acetone in the presence of an alkaline condensing agent to form allyl citrylidene acetone, an open chain compound having the following formula:

$$C(CH_3)_2=CH-CH_2-CH_2-C(CH_3)=CH-CH=CH-CO-CH_2-C_3H_5$$

This heretofore unknown compound is a liquid having a boiling point between 140 to 150° C. at 3 mm. pressure, has a specific gravity of .9070, is insoluble in water, and soluble in most of the usual organic solvents. It may be used as a starting material in the preparation of other compounds, such as allyl cyclo citrylidene acetone.

The reaction may be represented as follows:

(1) $C(CH_3)_2=CH-CH_2-CH_2-C(CH_3)=CH-CHO +$
(citral)
$CH_3-CO-CH_2-CH_2-CH=CH_2$ 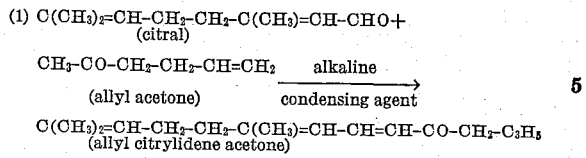
(allyl acetone)
$C(CH_3)_2=CH-CH_2-CH_2-C(CH_3)=CH-CH=CH-CO-CH_2-C_3H_5$
(allyl citrylidene acetone)

*Example:*—12 kilos of citral and 7 kilos of allyl acetone are agitated with 680 gms. of sodium alcoholate for about an hour at room temperature. The mixture is neutralized and the layer of unreacted allyl acetone and citral separated. The remainder of the mixture is then distilled at 140–170° C. and 10 mm. pressure. Allyl citrylidene acetone is thus obtained.

The proportions of reactants as given above are merely illustrative and may be varied considerably. In place of sodium alcoholate other alkaline condensing agents may be used, such as caustic soda, sodium amide.

I claim as my invention:

As a new compound, open chain allyl citrylidene acetone.

HENRI BARBIER.